UNITED STATES PATENT OFFICE.

FRANK HORNSEY WALKER, OF BROMLEY, AND CHARLES EMILE SOHN, OF HARRINGAY, ENGLAND.

MANUFACTURE OF VEHICLES FOR PAINTS AND THE LIKE.

999,611.

Specification of Letters Patent.

Patented Aug. 1, 1911.

No Drawing.

Application filed December 4, 1909. Serial No. 531,301.

*To all whom it may concern:*

Be it known that we, FRANK HORNSEY WALKER, a subject of the King of Great Britain and Ireland, and residing at "Craneton," 3 Holwood road, Bromley, in the county of Kent, and CHARLES EMILE SOHN, a subject of the King of Great Britain and Ireland, and residing at 82 Wightman road, Harringay, in the county of London, England, have invented certain new and useful Improvements in the Manufacture of Vehicles for Paints and the Like, of which the following is a specification.

Our invention relates to the manufacture of vehicles for carrying pigments for paints, inks and the like, and has for its object to produce a fluid or semi-fluid preparation, suitable for forming a vehicle for black and other pigments for coating upon brickwork, wood, metal, textile fabrics, paper or other surfaces. The product so obtained is a stable oleoaqueous medium suitable not only for blending with insoluble pigments but also for incorporating with oil-soluble and water-soluble dyes.

The invention consists in the preparation of a vehicle for carrying pigments and the like, from oil residuums, crude oils, rosin oil, natural and artificial asphaltic compounds, and waste products in the treatment of hydrocarbon oils, by treating such substances with sulfuric acid if necessary with application of heat and then neutralizing the mass and incorporating water therewith without separation of acid whereby compounds capable of absorbing relatively large quantities of water, and retaining the property of ready miscibility with oils, are obtained.

The invention further consists in the process for obtaining vehicles for pigments from waste products hereinafter described.

According to the invention the aforesaid asphaltic and other compounds are for this purpose first converted into sulfonic acids or allied derivatives by suitable treatment to be presently described and these derivatives are subsequently neutralized so as to form, in the case of the alkali salts, compounds capable of absorbing relatively large quantities of water or of completely dissolving in water, while retaining ready miscibility with or solubility in oils.

In carrying the invention into effect, according to one example, in which a mineral oil residuum is used, the mineral oil residuum is treated in the cold with a quantity of sulfuric acid, sufficient to precipitate the asphaltic and resinous constituents contained in it, the treatment being preferably carried out in a mixer provided with rotating and fixed arms to insure intimate mixture. The proportion of the acid used will vary with the character of the residuum dealt with. It will usually be from 5 per cent. to 20 per cent. of the weight of the oil. If solid compounds are dealt with, they are preferably dissolved in hydrocarbon oil before mixing with the acid. The mixture is then if necessary allowed to stand for a considerable time, and two layers will be formed, an upper layer of clarified oil, which may be decanted, and a lower tar-like mass, from which our improved vehicle for pigments and the like is obtained, the clarified oil being suitable for further purification, for use in the arts in which mineral oils are employed. The tarry mass is then subjected to a gentle heat, say 50° C. to 60° C. for a few hours, thereupon bringing about a more perfect combination between the organic matter and the acid. The mass is then returned to a mixer, and again agitated, while water and weak alkali in small quantities at a time is continually added until the desired quantity has been incorporated. Since excess of a fixed alkali would act destructively upon the combination, effecting saponification, the last stage of the neutralization is preferably carried out by means of ammonia.

By the above process, a completely homogeneous mass is obtained, which keeps indefinitely without showing any signs of the presence of water. The mass also mixes perfectly readily with oils, to form fluid varnishes, adapted to be incorporated with black or other dark pigment, and capable of being ground between steel rollers without losing its uniformity and smoothness.

The following are specific examples of methods of carrying out the process which have been found satisfactory:—To 500 pounds of an American black oil (petroleum residuum) placed in a mixer provided with mechanical stirrers there are added in small quantities spread over an interval of at least an hour 45 pounds of concentrated commercial sulfuric acid of specific gravity 1.84, this quantity of acid having been found from a previous experiment to be requisite for the precipitation of the asphaltic or tarry matters contained in the particular oil taken. After complete settling the clarified oil, which may be reincorporated at a later stage or otherwise used, is drawn off and the deposit consisting of acid together with the above mentioned tar-like bodies is further treated by warming for at least two hours from 50° to 60°. To every 34 pounds of the deposit there are added 20 pounds of water, the mixer being set in motion. When this first portion of water is completely taken up another 28 pounds of water are added gradually, this water having been previously mixed with ten pounds of caustic soda of specific gravity 1.358. When this quantity is taken up a mixture of 8 pounds of water and 2 pounds of ammonium hydrate solution of specific gravity .880 are added. After complete incorporation the further stirring is continued for an hour when it is found that the whole has formed a perfectly homogeneous mass or varnish with which more water may be incorporated or oil added if necessary.

In using the above product obtained as described in the specific example given above for the preparation of printing ink 85 pounds of the product are mixed with 15 pounds of dry black and 200 pounds of ordinary printing ink and the whole ground either in a flat stone mill or roller grinding mill. Such an ink will be found to have all the properties specially required in a newspaper ink. The water employed may be colored with anilin or other dyes and instead of lamp black other pigments may be used.

In order to obtain a paint by the use of the same product, 100 pounds of the product are mixed with 100 pounds of linseed oil, 150 pounds of brown umber or other coloring matter and after grinding 120 to 150 pounds of quick drying varnish, such as gold size are added. This produces a paint giving a good glossy surface when dry.

As an example of the application to outside brickwork or woodwork 100 pounds of the product produced by example given above, are incorporated in the mixer with 200 pounds of water. To the mixture is added a solution separately prepared by warming together 50 pounds of coal tar pitch and 750 pounds of coal tar, the quantities being varied according to the consistency of the product required. This mixture gives a jet black glossy coating.

In some cases, where greater tenacity is needed, gum or glue may be added to the water used, the gelatinizing property of the glue having been previously destroyed, but not its adhesive properties.

Having now described our invention what we claim as new and desire to secure by Letters Patent is:—

1. A process for preparing vehicles for carrying pigments from oil residuums, which consists in treating the residuum with sulfuric acid, adding just sufficient alkali to neutralize the mass, and incorporating water with the mixed residuum and acid.

2. A process for preparing vehicles for carrying pigments from oil residuums, which consists in treating the residuum with sulfuric acid, heating, adding just sufficient alkali to neutralize the mass, and incorporating water with the mixed residuum and acid.

3. The improved vehicle for carrying pigments prepared from oil residuums, by treating the residuum with sulfuric acid, neutralizing and incorporating water with the mixed residuum and acid.

In testimony whereof we affix our signatures in presence of two witnesses.

FRANK HORNSEY WALKER.
CHARLES EMILE SOHN.

Witnesses:
AUBREY THOMAS EVANS,
GEORGE TAPPIN.